United States Patent
Hare, Jr.

(10) Patent No.: US 8,223,934 B2
(45) Date of Patent: Jul. 17, 2012

(54) METHOD OF RESTRICTING USE OF A PACKETCABLE SIP OR NCS E-MTA LINE TO FAX-ONLY

(75) Inventor: William C. Hare, Jr., Cumming, GA (US)

(73) Assignee: ARRIS Group, Inc., Suwanee, GA (US)

( * ) Notice: Subject to any disclaimer, the term of this patent is extended or adjusted under 35 U.S.C. 154(b) by 1243 days.

(21) Appl. No.: 11/961,898

(22) Filed: Dec. 20, 2007

(65) Prior Publication Data

US 2009/0161848 A1 Jun. 25, 2009

Related U.S. Application Data

(60) Provisional application No. 60/877,277, filed on Dec. 27, 2006.

(51) Int. Cl.
*H04M 11/00* (2006.01)
(52) U.S. Cl. ......... 379/100.14; 379/100.17; 379/100.01; 379/90.01
(58) Field of Classification Search ............... 379/90.01, 379/93.01–93.02, 93.05–93.06, 93.09, 100.01–100.16; 358/400
See application file for complete search history.

(56) References Cited

U.S. PATENT DOCUMENTS 7,151,823 B2 * 12/2006 Durkin ................ 379/93.02

FOREIGN PATENT DOCUMENTS

JP 11205483 A * 7/1999

* cited by examiner

*Primary Examiner* — Melur Ramakrishnaiah
(74) *Attorney, Agent, or Firm* — Troy A. Van Aacken; Robert J. Starr

(57) ABSTRACT

A fax-only MIB stores a value that is used as a counter of a timer. Upon initiating or receiving a call at an endpoint with which the fax-only MIB value is associated, a user device that provides the endpoint begins a timer based on the MIB value. During the timer period processing circuitry and/or software of the user device associated with the endpoint determines whether a tone generated/received by a call being initiated/received is a fax or modem tone. If the device determines that such a tone has been generated/received, a call corresponding to the tone is processed. If the device does not determine that a fax/modem tone has been generated/received, the call being initiated or received at the endpoint is dropped.

8 Claims, 1 Drawing Sheet

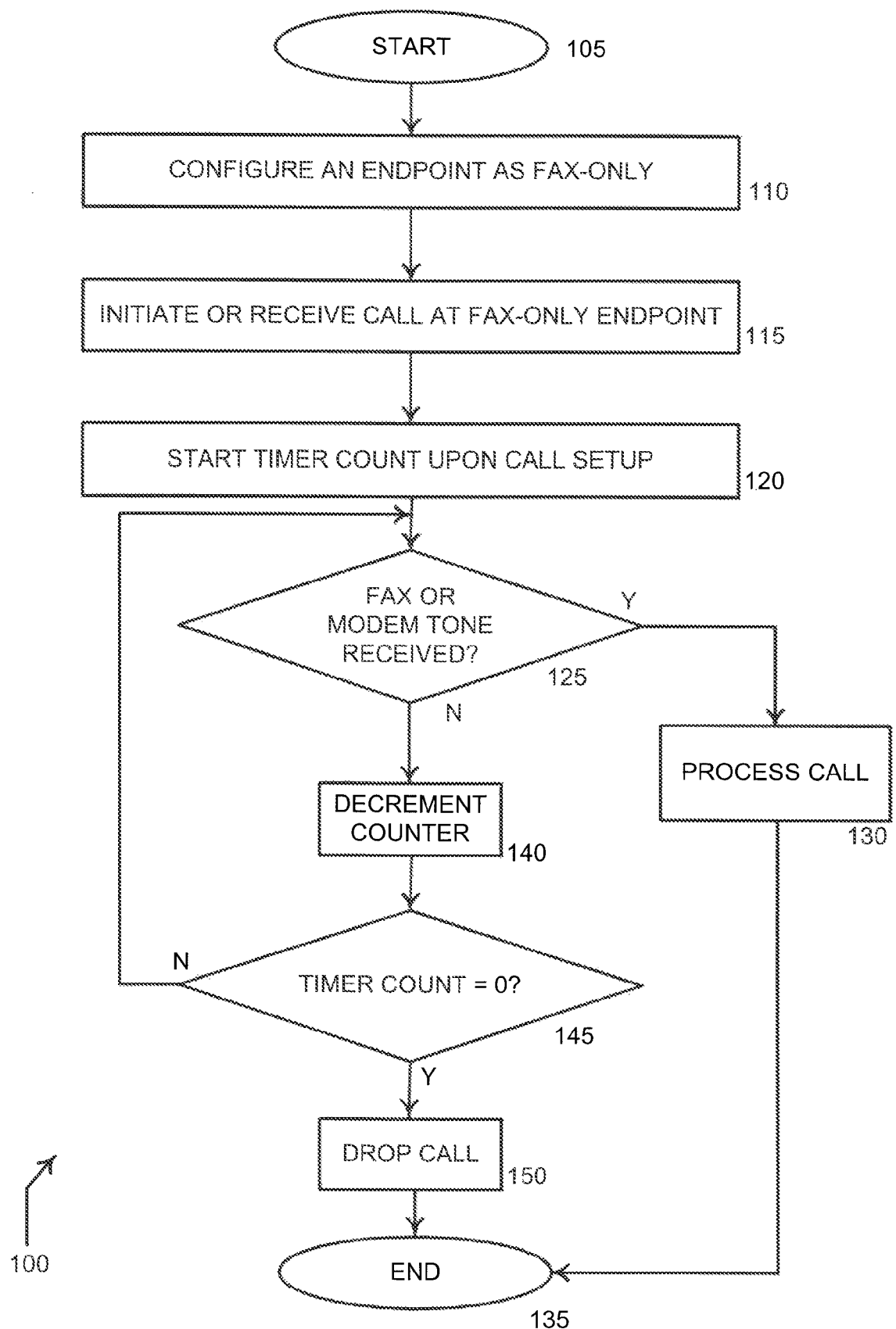

METHOD OF RESTRICTING USE OF A PACKETCABLE SIP OR NCS E-MTA LINE TO FAX-ONLY

CROSS REFERENCE TO RELATED APPLICATION

This application claims priority under 35 U.S.C. 119(e) to the benefit of the filing date of Hare, et. al., U.S. provisional patent application No. 60/877,277 entitled "Method of restricting use of a PacketCable SIP or NCS E-MTA line to fax-only," which was filed Dec. 27, 2006, and is incorporated herein by reference.

FIELD OF THE INVENTION

This invention relates, generally, to communication networks and, more particularly to the provisioning of an endpoint on a user communication device to support fax-only telephony calls.

BACKGROUND

Providers of telephony over IP networks may desire to increase revenue by providing more than one line (i.e., more than one telephone number) from corresponding multiple ports from a user device, such as a telephone modem that operates according to the PacketCable standard, for example. However, some customers may decide not to pay for more than one line to use for a fax machine, for example, due to cost. Therefore, there is a need in the art for a system and method for providing a lower cost line that supports facsimile transmissions (both send and receive operations) but does not support voice telephone calls.

BRIEF DESCRIPTION OF DRAWINGS

FIG. 1 illustrates a flow diagram of a method for providing a fax-only line from an E-MTA device.

DETAILED DESCRIPTION

As a preliminary matter, it readily will be understood by those persons skilled in the art that the present invention is susceptible of broad utility and application. Many methods, embodiments and adaptations of the present invention other than those herein described, as well as many variations, modifications, and equivalent arrangements, will be apparent from or reasonably suggested by the present invention and the following description thereof, without departing from the substance or scope of the present invention.

Accordingly, while the present invention has been described herein in detail in relation to preferred embodiments, it is to be understood that this disclosure is only illustrative and exemplary of the present invention and is made mercy for the purposes of providing a full and enabling disclosure of the invention. The disclosure is not intended nor is to be construed to limit the present invention or otherwise to exclude any such other embodiments, adaptations, variations, modifications and equivalent arrangements, the present invention being limited only by the claims appended hereto and the equivalents thereof.

Turning now to the figures, FIG. 1 illustrates a flow diagram of a method 100 for facilitating a fax-only line on a communication device. The communication device may be a device having an E-MTA for providing telecommunication services over an Internet Protocol ("IP"), often referred to as voice over IP, or VoIP. Method 105 begins at step 105 and an endpoint is configured at the device at step 110. Step 110 may include using a management information base ("MIB") object under the Session Initiation Protocol ("SIP") MIB to configure the treatment of fax calls on a SIP endpoint. The SIP endpoint configured at step 110 may be a single endpoint or one of a plurality of endpoints coupled to an EMTA within a user device, such as, for example, a TOUCHSTONE® Telephony Modem as manufactured by ARRIS Group, Inc. A fax-only-configuration MIB that facilitates the endpoint supporting only fax calls is referred to as sipCfgPortFaxOnly-Timeout. Method 100 associates this fax-only-configuration MIB with a particular SIP endpoint to define a line coupled thereto as a fax-only line. Method 100 associates the fax-only MIB with the particular SIP endpoint according to input, perhaps from a user of the user device, from a manufacturer of the user device or from a service provider who delivers service via the user device. For purposes of discussion, the term endpoint refers to a logical port of a user device that is provisioned for transmitting and receiving telephony calls, and may or may not be associated with a specific physical port (e.g., RJ-11 jack) of the user device.

The default value of the fax-only-configuration MIB object may be initialized to zero, which may be defined to mean no timeout. After initiating or receiving a call at the endpoint at step 115, method 100 starts a timer, based on the value stored in the fax-only-configuration MIB, at step 120 if the fax-configuration MIB is set to a non-zero value. It will be appreciated that the MIB object is configured in units of seconds.

After the timer starts counting down, method 100 determines at step 125 whether the fax-only endpoint has detected either a fax or modem tone. It will be appreciated that a modem tone could be received from either an actual dial-up modem, for example, or from a fax modem device that is sending facsimile message transmission according to a facsimile protocol, such as, for example, T.30: and/or T.38.

If method 100 determines at step 125 that a fax or modem tone has been received at the fax-only endpoint, the EMTA (or MTA), or device which includes the EMTA that is executing method 100, processes the call at step 130. The processing at step 130 occurs even if the call is from a dial-up modem attempting to connect to the endpoint, even if there is not a computer coupled to the user device. Following processing at step 130, method 100 ends at step 135.

Returning to discussion of the determination at step 125, if method 100 determines that neither a fax nor modem tone has been received, the counter value is decremented at step 140. A determination is made at step 145 whether the timer count value has decremented to zero, or less than zero in the case where a user or operator initializes the fax-configuration MIB value as zero. If method 100 determines that the timer count value is greater than zero, the method returns to step 125 and determines whether a fax or modem tone has been received at the fax-only endpoint. If method 100 determines that the timer count value has decremented to zero (or less than zero), the method causes the user device at step 150 to drop the call that was received, or initiated, at step 115. Thus, if the call is/was a voice call, the user cannot initiate/accept the call on the fax-only line. After method 100 drops the call at step 150, the method ends at step 135.

What is claimed is:

1. A method for operating a line of a packet based user device as fax-only, comprising:
   configuring an endpoint in a packet based network that is associated with the line as fax-only;

setting up a call at the fax-only endpoint on the packet based network, wherein the call may be an outgoing call being initiated or an incoming call being received over the packet based network;

starting a timer upon setting up the call at the fax-only endpoint, the timer counting down for a predetermined period based on a fax-only configuration value;

determining whether a fax or modem tone is detected within the packets received at the fax-only endpoint during the period the timer is counting down; and processing the call if a fax or modem tone was detected during the timer period.

2. The method of claim 1 wherein the fax-only configuration value is stored in an MIB object for the packet based user device.

3. The method of claim 2 wherein the method operates on a session initiation protocol (SIP) based protocol.

4. A method for operating a line of a packet based user device as fax-only, comprising:

configuring an endpoint in a packet based network that is associated with the line as fax-only;

setting up a call at the fax-only endpoint, wherein the call may be an outgoing call being initiated or an incoming call being received over the packet based network;

starting a timer upon setting up the call at the fax-only endpoint, the timer counting down for a predetermined period based on a fax-only configuration value;

determining whether a fax or modem tone is detected within packets received at the fax-only endpoint during the period the timer is counting down; and dropping the call if a fax or modem tone is not detected before the timer reaches zero.

5. The method of claim 4 wherein the fax-only configuration value is stored in an MIB.

6. The method of claim 5 wherein a protocol used to communicate the packets comprises session initiation protocol (SIP).

7. A device for processing calls in a packet based network, comprising:

a first memory for storing code, wherein the code facilitates operating an endpoint at the device as a fax-only endpoint operable to receive packet based fax signals;

a second memory for storing a fax-only configuration value;

a processor adapted to operate a timer according to the code, the counter beginning counting when a call is initiated or received at the fax-only endpoint and ending counting when the fax-only configuration value has been counted by the timer; the processor also being adapted to determine whether to process the call according to the code based on whether the processor detects that the call transmitted a fax or modem tone.

8. The device of claim 7 wherein the first memory and the second memory are portions of a memory.

* * * * *